US005997677A

United States Patent [19]

Zaher

[11] Patent Number: 5,997,677

[45] Date of Patent: Dec. 7, 1999

[54] METHOD TO APPLY A COLORED DECORATIVE DESIGN ON A SUBSTRATE OF PLASTICS

[75] Inventor: Maximilian P. Zaher, Hamburg, Germany

[73] Assignee: General Electric Company, Pittsfield, Mass.

[21] Appl. No.: 08/152,080

[22] Filed: Nov. 9, 1993

Related U.S. Application Data

[63] Continuation of application No. 07/777,295, Dec. 6, 1991, abandoned.

[30] Foreign Application Priority Data

May 8, 1990 [EP] European Pat. Off. .............. 90108663
May 2, 1991 [WO] WIPO ...................... PCT/EP91/00839

[51] Int. Cl.$^{6}$ .............................. B32B 31/26; B41M 3/12

[52] U.S. Cl. ....................... 156/230; 156/277; 156/272.2; 156/273.1; 156/286; 101/492

[58] Field of Search .................................... 430/200, 202; 156/87, 230, 240, 277, 272.2, 273.1, 285, 286, 380.9, 382; 8/467, 468, 471, 472, 506; 101/492

[56] References Cited

U.S. PATENT DOCUMENTS

| | | | |
|---|---|---|---|
| 2,721,821 | 10/1955 | Hoover . | |
| 3,780,214 | 12/1973 | Bestenreiner et al. | 346/76 L X |
| 3,966,396 | 6/1976 | Howes et al. | 430/200 X |
| 4,056,352 | 7/1976 | Mayer . | |
| 4,060,382 | 11/1977 | Vertegaal | 8/467 X |
| 4,088,440 | 5/1978 | Leimbacher et al. . | |
| 4,178,782 | 12/1979 | Schiffer . | |
| 4,199,317 | 4/1980 | Serex et al. . | |
| 4,210,412 | 7/1980 | Yamane et al. . | |
| 4,314,814 | 2/1982 | Deroode . | |
| 4,395,718 | 7/1983 | Murayama et al. | 346/135.1 |
| 4,399,749 | 8/1983 | Arai | 346/76 PH X |
| 4,465,728 | 8/1984 | Haigh et al. | 8/506 X |
| 4,555,427 | 11/1985 | Kawasaki et al. | 428/913 X |
| 4,572,684 | 2/1986 | Sato et al. | 427/265 X |
| 4,587,155 | 5/1986 | Durand . | |
| 4,764,444 | 8/1988 | Simons et al. | 430/200 X |
| 4,820,310 | 4/1989 | Fukui | 8/471 X |
| 4,990,486 | 2/1991 | Kamosaki et al. | 428/913 X |

FOREIGN PATENT DOCUMENTS

| | | |
|---|---|---|
| 860888 | 1/1971 | Canada . |
| 1282278 | 2/1991 | Canada . |
| 0014901 | 2/1980 | European Pat. Off. . |
| 0014615 | 8/1980 | European Pat. Off. . |
| 0098506 | 1/1984 | European Pat. Off. . |
| 2230794 | 12/1974 | France . |
| 1771812 | 2/1972 | Germany . |
| 2337798 | 2/1974 | Germany . |
| 2438723 | 3/1975 | Germany . |
| 2436783 | 9/1976 | Germany . |
| 2424949 | 1/1978 | Germany . |
| 2642350 | 3/1978 | Germany . |
| 2458660 | 7/1979 | Germany . |
| 3228096 | 2/1984 | Germany . |
| 3708855 | 2/1988 | Germany . |
| 3904424 | 1/1990 | Germany . |
| 1107401 | 3/1968 | United Kingdom . |
| 1463596 | 2/1977 | United Kingdom . |
| 1517832 | 7/1978 | United Kingdom . |
| 2127747 | 4/1984 | United Kingdom . |

*Primary Examiner*—Curtis Mayes

[57] ABSTRACT

In a method of applying a decorative design of dyestuffs suitable for sublimation on to a substrate (10), provision is made for placing a dye carrier (12) on the substrate (10) and transferring the dye to the substrate by infrared heating of the carrier (10). The carrier is heated to temperatures below 170° C., depending on the plastics of the substrate, and the carrier is pressed by its entire surface area against the substrate by means of electrostatic charging and vacuum. The side of the substrate (10) to which the decorative design is applied is heated less than the opposite side of the substrate.

7 Claims, 4 Drawing Sheets

METHOD TO APPLY A COLORED DECORATIVE DESIGN ON A SUBSTRATE OF PLASTICS

This application is a continuation of application Ser. No. 07/777,295, filed on Dec. 6, 1991, now abandoned.

The invention relates to a method of applying a decorative design of dyestuffs on a substrate made of plastics, wherein a dye carrier is placed on the substrate and the dye transferred to the substrate by heating the carrier by infrared radiation.

Furthermore, the invention relates to an apparatus for carrying out such a method and to a product made accordingly.

Methods and apparatus of that kind are known from DE 37 08 855 C1 and DE 39 04 424 C1.

It is known from German patents 17 71 812, 23 37 798, 24 36 783 and 24 58 660 to imprint textile fabrics by the so-called transfer printing process. That includes printing print images (decorative designs) of sublimation printing inks on a dye carrier (also referred to as auxiliary carrier). The dye carrier (auxiliary carrier) may be made especially of paper. The printing is done, for instance, by offset or rotary printing methods. The print images are transferred by sublimation (so-called transfer printing) from the dye carrier to the textile fabric which is to be decorated with colors.

The printing inks mentioned are prepared from sublimable disperse dyestuffs, making use of binders and oxidation additives. With the state of the art, the printed dye carriers (also referred to as transfer papers) are placed with their color-imprinted side on the textile face to be imprinted and heated either by means of a printing plate which itself is heated to from 170 to 220° C. (intermittent process) or by means of a revolving cylinder (continuous process). As soon as the temperature of about 170 to 220° C. reaches the dyestuffs, they sublime into the textiles made of synthetic fibers.

A known method of the kind described (EP-A 00 14 615), provided in the first place for decorating spectacle frames, is carried out in such manner that during each work cycle a spectacle frame is positioned on a support, with its surface area to be decorated in upward direction, the support is disposed inside a vacuum chamber and movable up and down by means of a piston and cylinder unit. The vacuum chamber has a lateral opening, adapted to be closed by a door, for the introduction of the spectacle frame. At its upper side the vacuum chamber has a horizontal stationary frame defining a slot together with another horizontal frame arranged above it but being movable up and down. A carrier foil is guided through the slot, being unrolled from a reel and carrying, at its bottom side, the decorative design for transfer to the spectacle frame. The decorative design was applied to the carrier foil as a multi-color print or transfer, and it consists of dyes which are sublimable at a temperature below the temperature of destruction of the carrier foil. As soon as the spectacle frame has been introduced into the vacuum chamber and the door thereof been closed, the upper frame is lowered so that it will clamp the carrier foil between itself and the lower frame, whereby the vacuum chamber is closed tightly and can be evacuated. The carrier foil is heated to the sublimation temperature of the decorative design by means of a heater device arranged above the upper frame, and thereupon the spectacle frame is moved upwardly and pressed against the carrier foil by means of its support adapted to be moved up and down in the vacuum chamber and on which the spectacle frame had been deposited. Due to the vacuum, the carrier foil comes to lie snugly against front and side areas of the spectacle frame which are to be decorated. This condition is maintained for a period of time which is sufficient for the dyes forming the decorative design to become transferred away from the carrier foil and into the structure of the material of which the spectacle frame is made. Subsequently the vacuum is neutralized, the spectacle frame is lowered, thereby being separated from the carrier foil, and finally removed from the vacuum chamber.

With this known method, the carrier foil is elongated very much in individual areas so that it will cling tightly enough to the spectacle frame. That makes distortions of the decorative design unavoidable in those areas of the carrier foil which are extended very much. To a certain extent the distortions can be compensated if a decorative design corrected accordingly has been applied from the very beginning to the carrier foil. Besides, distortions are hardly noticeable if they occur in articles, like spectacle frames, whose surface areas to be decorated are rather narrow. The situation is different with articles which are to be decorated in large surface areas. With such articles, disturbingly noticeable distortions of the decorative design cannot always be avoided if the decorative design was applied according to the known method. Moreover, as the size of the surface area to be decorated becomes bigger, so does the risk that the decorative design will be impaired by air cavities.

In the case of another known method of applying decorative designs to articles (DE-A-32 28 096) the latter, for example tin cans, first are passed through a coating unit which will coat the outside of the articles with a layer of plastics having an affinity for dyestuffs and preventing migration. Upon chemical or physical drying of this coating the articles thus coated are fed to a labelling machine in which carriers of decorative designs in the form of printed revenue seals are withdrawn from a stack or endless strip, positioned around an article each, and attached by an adhesive strip, a dash of glue, an electrostatic field, and the like. Thereupon the articles are heated, for instance by hot air, to a temperature of from 200° to 350° C., preferably 250° to 300° C. At these temperatures which create an extreme heat shock, any water contained in the revenue seals evaporates instantly whereby each revenue seal will become shrunk on the associated article in a fraction of a second, autogenously producing the pressure which is needed to transfer the decorative design from the revenue seal to the article. During the further heating, the dyestuffs presenting the decorative design sublimate into the plastics coating underneath.

It is of decisive importance with this method that the relative movement which is unavoidable in shrinking on a revenue seal, with respect to the associated article, be finished before the dyestuffs presenting the decorative design have become heated to such a point that they begin to migrate into the layer of plastics. If this difficult condition is not maintained it must be expected that at least parts of the decorative design will be blurred on the article.

U.S. Pat. No. 4,178,782 discloses an apparatus for imprinting a textile web with a sublimable dyestuff which is supplied on a carrier foil. The apparatus comprises a drum adapted to be driven in rotation and heated from inside, the carrier foil with a radially outwardly facing dyestuff layer being the lowermost element to run around the drum, the textile web to be printed on being the next above, and an endless contact pressure belt of metal fabric passed around rollers being on top of the latter. The range of the drum thus wrapped may be enclosed by a hood within which low pressure is maintained. In this manner any gas released upon sublimation of the dyestuff is sucked off through the textile web to be printed and the woven metallic contact pressure belt on top of it. The contact pressures exerted by the contact pressure belt on the textile web are generated exclusively by the mechanical tension of the contact pressure belt and are reduced somewhat by the low pressure within the hood.

An attempt has become known from DE 26 42 350 C1 to print also certain plastic products, which are poor in accepting the sublimable dyestuffs in question, by the transfer printing method which previously had been used successfully with textile fabrics. In that case it was attempted to coat such bodies with thermoplastic films which accept the dyestuffs and then it was attempted to print on the films by the transfer printing process explained above. However, the method did not prove successful, in particular not because the migration stability of the dyestuffs (i.e. the permanence of the dyestuffs following the transfer print) was assured only with medium to high molecular dyestuffs (at molecular weights between 300 and 1000). Temperatures of more than 180° C. and 200 to 220° C., respectively, were used for sublimation for a period of at least 25 seconds. Yet at these relatively high temperatures most thermoplastic films fuse or become so soft that the dye carriers (paper etc.) used in the transfer printing get stuck or damage the surfaces of the films so much that the product did not meet the esthetic demands. The migration resistance of the dyestuffs needed for good image reproduction was not achieved either.

Therefore, in the state of the art up to now results worth mentioning in the sublimation print transfer process were obtained only with duroplastic films and varnishes (FR-A-2,230,794 DE-A 24 24 949, GB-A-1 517 832). These methods, however, did not provide satisfactory reproducible results. Neither the materials nor the sublimation procedure are described with sufficient precision. The results obtained left something to be desired, especially because of yellowing and little migration resistance as well as blurring of the colors.

There has long been a need for being able to provide thermoplastic substrates with colored decorative designs of good quality in view of the fact that such broad use is being made of thermoplastic films and plates which can be thermally deformed into three-dimensional bodies, like structural members for internal finish, parts of furniture (especially fronts), household utensils, office machinery, incandescent bodies, molded parts of automobiles, etc.

EP 0 014 901 describes a test directed at obtaining constant, reproducible, and stable transfer print results by a more precise specification of the molecular weights of the sublimable disperse dyestuffs, the temperatures applied, and the composition and nature of the plastics substrates. It was found, in that case, that heating to temperatures of 220° C. and above is required if the transfer print method is applied to plastics. That excludes a great number of thermoplastic materials. The method remained restricted to certain duroplastic coatings and certain substrates of inorganic materials.

The prior art also teaches, as a prejudice, that the molecular weight of the dyestuffs used is essential in the transfer print. The above mentioned EP 0 014 901 teaches the use of high molecular disperse dyestuffs having molecular weights between 300 and 1000, especially with a view to the required migration resistance. German patents 37 08 855 and 39 04 424 already mentioned above afford some progress in that they give up the use of heated printing plates or heated cylinders in transfer printing and instead suggest to utilize heating by thermal radiation (infrared radiation). This prior art does not deal with details of the materials used or the sublimation temperatures.

It is the object of the invention to provide a method by which a plurality of substrates made of plastics, including thermoplastic substrates, whose heat resistance also may be no more than 100° C., can be color-decorated in good quality by transfer printing. The print result is to satisfy esthetically high demands and be of good durability. Furthermore, a product made according to the invention is to be deformable thermoplastically without impairing the decorative design.

The solution according to the invention to meet those objects is based on the finding that the manner in which the heat is coupled into the sublimation range is essential in respect of the temperatures to be applied in the transfer printing. The prejudice which exists in the prior art that temperatures higher than 200° C. or at least 170° C. had to be used in the sublimation transfer printing operation, can be overcome if the temperature is transmitted to the dye carrier by infrared radiation rather than by heated printing plates or heated rotary cylinders. In this manner disperse dyestuffs are sublimable at temperatures above 100° C. already, regardless of the molecular weight (in contradistinction to the prior art discussed above).

Essential aspects of the solution according to the invention are characterized. Preferably, decorative designs of high quality on substrates of plastics, including thermoplastic materials of a heat resistance down to 100° C. are obtained by the present invention, additional provision being made for the dye carrier to consist of a porous material (i.e. air permeable material) so that gas from the reverse side (i.e. the unprinted surface) of the dye carrier can be sucked through the same during the sublimation so that the dye carrier will cling 100% to the substrate to be decorated and the formation of pleats in the dye carrier as well as the occlusion of gas between the dye carrier and the substrate are avoided.

Likewise novel is a product made of or including a plastics substrate on which a colored decorative design is applied by sublimation of dyestuffs from a dye carrier, where the plastic material is a thermoplastic material whose heat resistance is less than 200° C., especially less than 170° C. Preferably, the invention even provides for temperatures to be only in the range of from 100 to 130° C.

The invention will be described further below with reference to the figures, in which.

Figure 1:
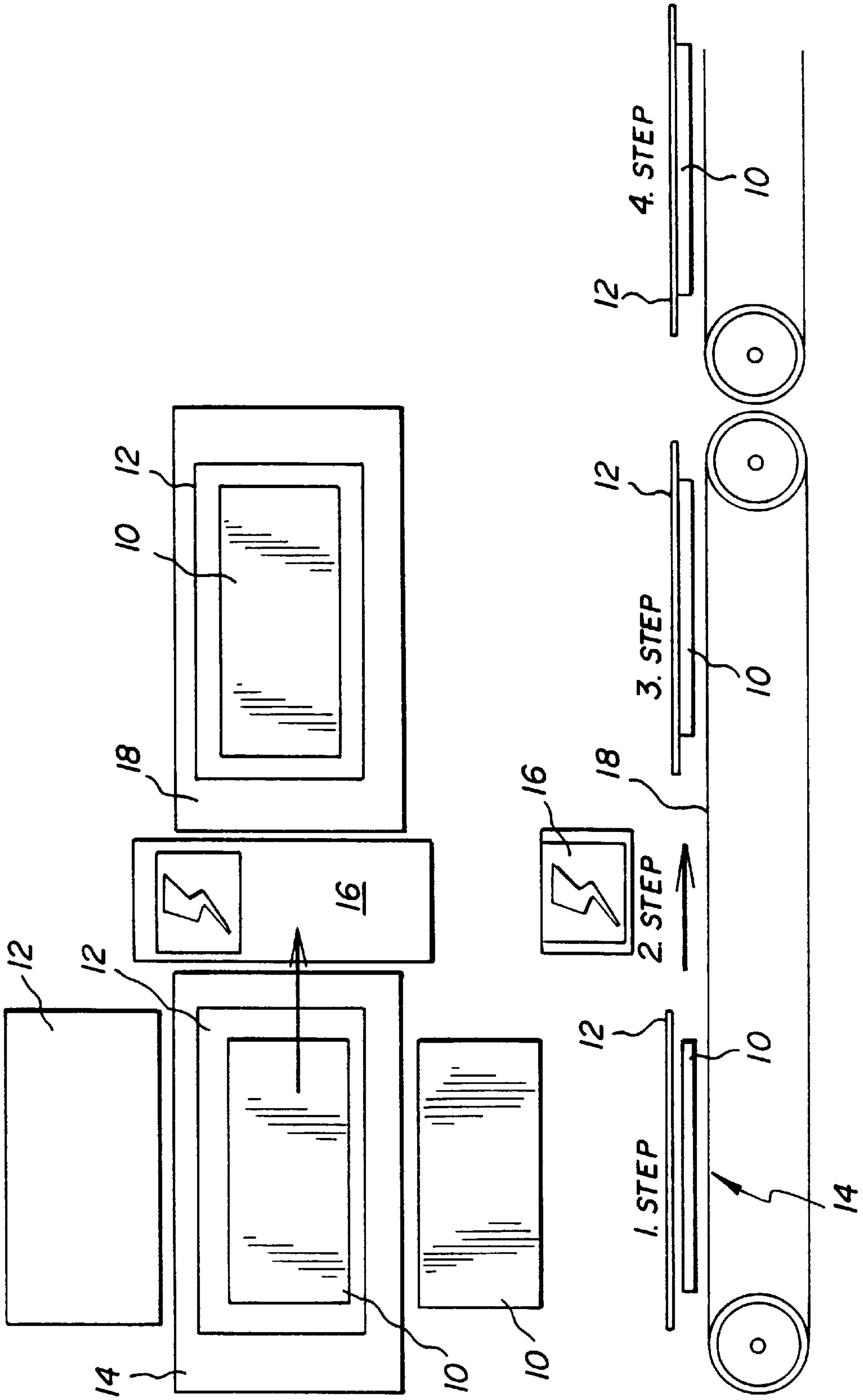
FIG. 1 illustrates the preparation of a substrate and dye carrier for transfer printing in top plan and side elevational views.

A substrate 10 is to be decorated with an image of sublimable disperse dyestuffs by transfer printing. The term substrate is to comprise especially films, foils, or plates, the films or foils having thicknesses which may range from 25 to 1000 microns and the plates having thicknesses which may range from 1 to 10 mm. The films, foils, or plates may be extruded from granular plastics, mixtures of granular materials, or of a plurality of different plastics or mixtures. The mixtures may contain additional inorganic particles (powder, flour), the proportion of plastics at the surface of the substrate preferably being more than 50%. Suitable plastics for use with the invention especially are: PC (polycarbonate), ABS, PMMA, PET, and PDT. The process parameters are adjusted in response to the material used (see further down).

The plastics films, plates, or foils also may be composed of several types and layers of plastics.

The method according to the invention is suitable not only for smooth substrate surfaces but also for surfaces which are structured, porous, dull, and rough. The substrate material may be clear or dyed.

A substrate is to be understood as including a layer of plastics applied as a varnish coat on a surface of such material as wood, ceramics, or artificial stone, if desired by crosslinking.

If plastics are used which either are sensitive or less resistant to chemical and mechanical stress or to light, then they may be coated, after being printed in accordance with the invention, with per se known more stable varnishes or layers of other types of plastic material.

The substrate 10 is subjected to color-printing with the aid of a dye carrier 12. To that end, the image to be transferred to the substrate is printed on the dye carrier 12 with the aid of sublimable disperse dyestuffs. Suitable dye carriers 12 above all are sheets of paper which, on the one hand, are at good at accepting the image of sublimable dyes to be transferred and, on the other hand, are sufficiently permeable to air so that air can be sucked through the dye carrier 12 during the sublimation transfer printing. Good results are obtained with paper weights of from 30 to 120 g. The surface area of the paper may be of any desired size, especially 1 $m^2$ or bigger.

Sublimable disperse dyestuffs of conventional kind are processed to printing inks by making use of binders and, if desired, oxidation additives. The images, patterns, individual colors, or features to be shown on the substrate 10 are printed on the dye carrier 12 by offset, rotary, intaglio, flexographic, or screen printing methods.

According to FIG. 1, the substrate 10 to be imprinted is deposited in a loading station 14, and a dye carrier 12 is placed on the substrate. As shown, the printed dye carrier 12 made of paper is much larger than the substrate 10 so that the dye carrier clearly overlaps the substrate at all its edges. In the embodiment illustrated, the area of overlap is at least 20%, preferably at least 30%.

The substrate and dye carrier layers thus positioned on top of each other in a first step are transported, in a second step, into a station 16 for electrostatic charging. Here the substrate 10 is charged electrostatically with respect to the dye carrier 12 in such manner that the dye carrier 12 will come to lie flush against the surface of the substrate 10 by its entire surface area. That is accomplished in the third step according to FIG. 1. In the fourth step, the assembly of substrate 10 and dye carrier 12 clinging as if glued to it, is transported to a sublimation station, shown in greater detail in FIG. 2.

A conveyor belt 18 transmits the assembly of substrate 10 and dye carrier 12, produced as described above, to a table 20 including a heater plate formed with air permeable vertical channels (not shown) so that air can be sucked through the table plate from top to bottom in the figures. To that end, a vacuum chamber 22 is arranged below the table plate and connected to a vacuum pump, not shown.

Figure 2:
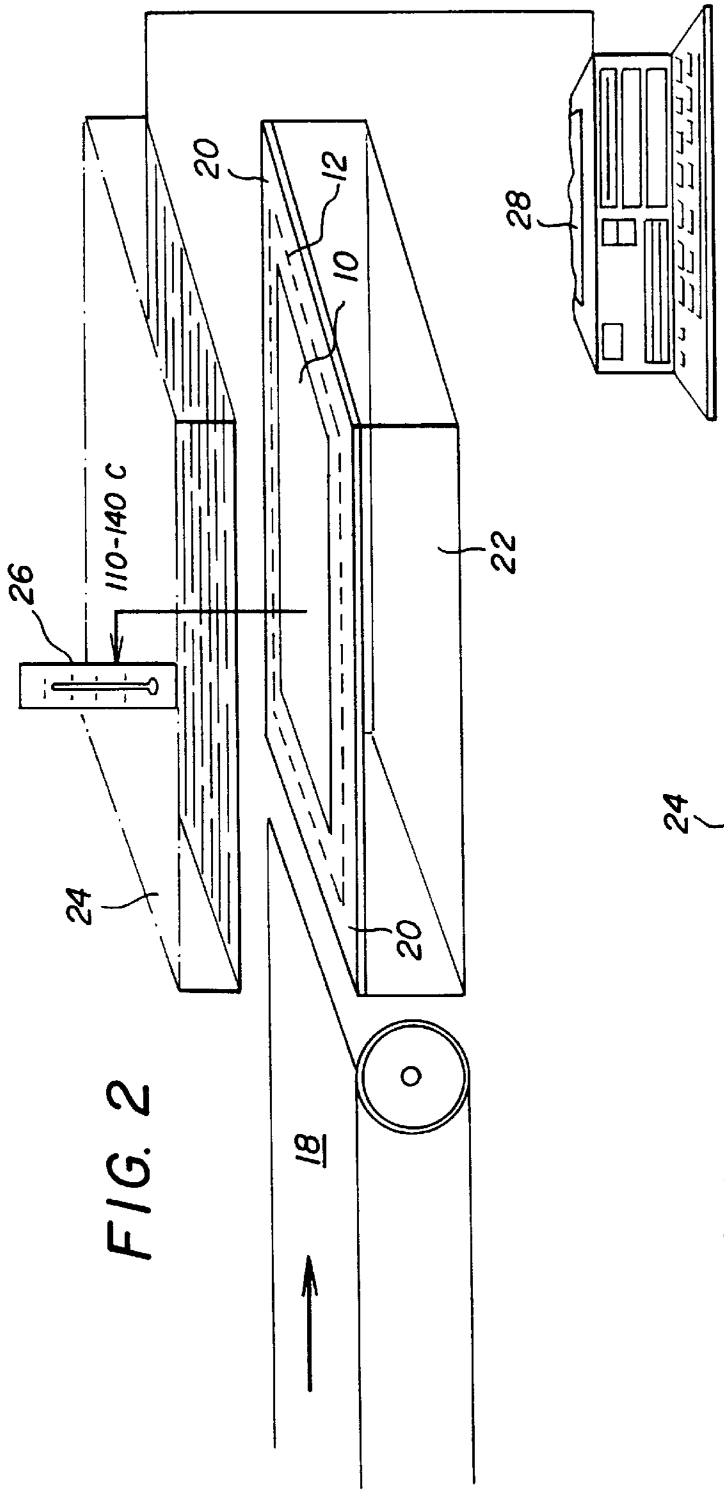
FIGS. 2 and 3 are diagrammatic views of the transfer printing.
Figure 3:
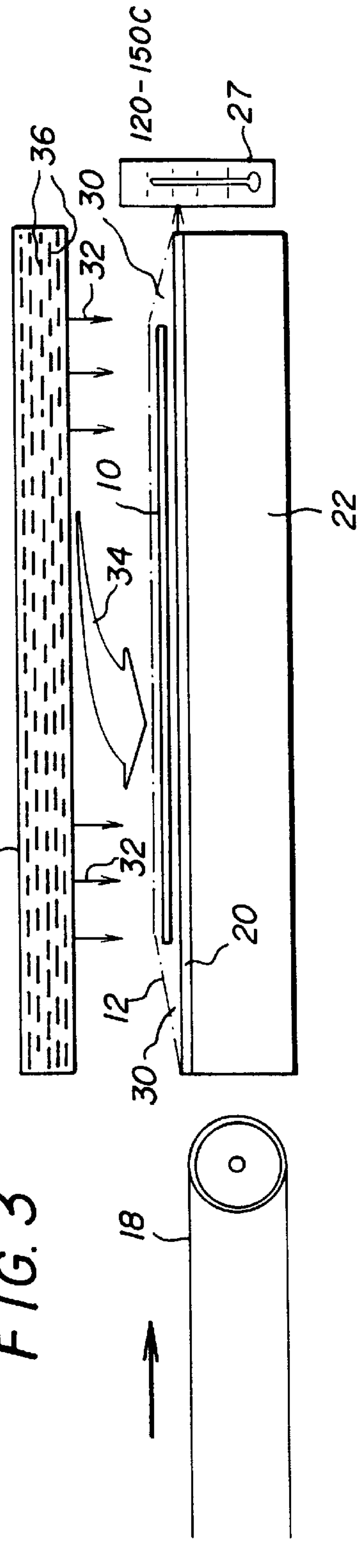

According to FIGS. 2 and 3, the substrate 10 with the dye carrier 12 firmly engaged on top of it is conveyed on to the table 20, and thereupon vacuum is applied in the chamber 22. Neither a cover foil above the dye carrier 12 nor a backing between the substrate 10 and the table 20 are needed.

A housing 24 in which a plurality of infrared radiators 36 are disposed side by side is arranged above the table 20. The housing 24 with its infrared radiators 36 overlappingly covers the entire area of the substrate 10 and the dye carrier 12. A temperature measuring means 26 measures the temperature at the surface of the substrate 10 facing the infrared radiators and the side of the of the dye carrier 12 abutting it and carrying the sublimable disperse dyestuffs. Another temperature measuring means 27 measures the temperature of the heater plate of the table 20 and thus the temperature at the surface of the substrate 10 which is in direct contact with the table 20, in other words the side of the substrate 10 which does not become decorated.

Figure 5:
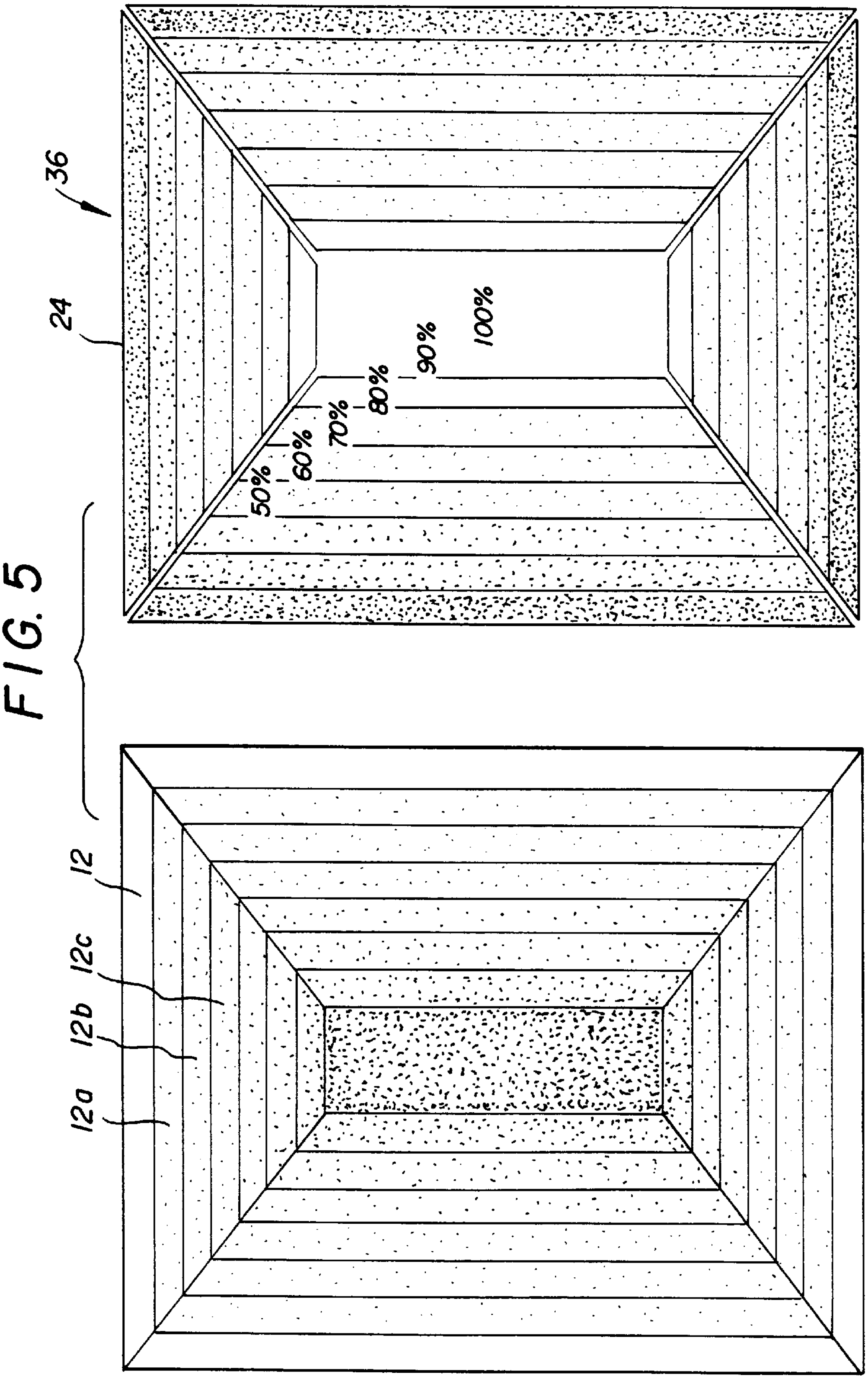
FIG. 5 illustrates a color distribution of an image to be printed and corresponding control of the intensity of infrared radiators.

The individual infrared radiators 36 in the housing 24 are controlled to different temperatures by means of a control 28, as will be explained in greater detail below with reference to FIG. 5.

As shown diagrammatically in FIG. 3, air is sucked through the porous dye carrier 12 into the vacuum chamber 22, specifically through the channels (not shown) in the heated table plate 20. That evacuates the margin space 30 between the overlapping dye carrier 12, the substrate 10, and the table 20 so that the dye carrier 12 attracts itself to the substrate 10, uniformly throughout its full area. No folding or warping occurs in the dye carrier 12 and air or gas bubbles are removed. That is true in particular of the heating during sublimation with the formation of vapor.

In this state, the table 20 and the infrared radiators 36 are heated. The infrared radiation 32 produced by the infrared radiators 36 serves to heat up the sublimable dyestuffs located on the bottom side of the dye carrier 12, while the heating of the table 20 serves the purpose of heating the substrate 10 at the unprinted side. This heating of the substrate 10 is done not only to achieve form stability of the substrate but, what is more, has essential effects on the penetration of the dye molecules into the substrate 10.

Figure 4:
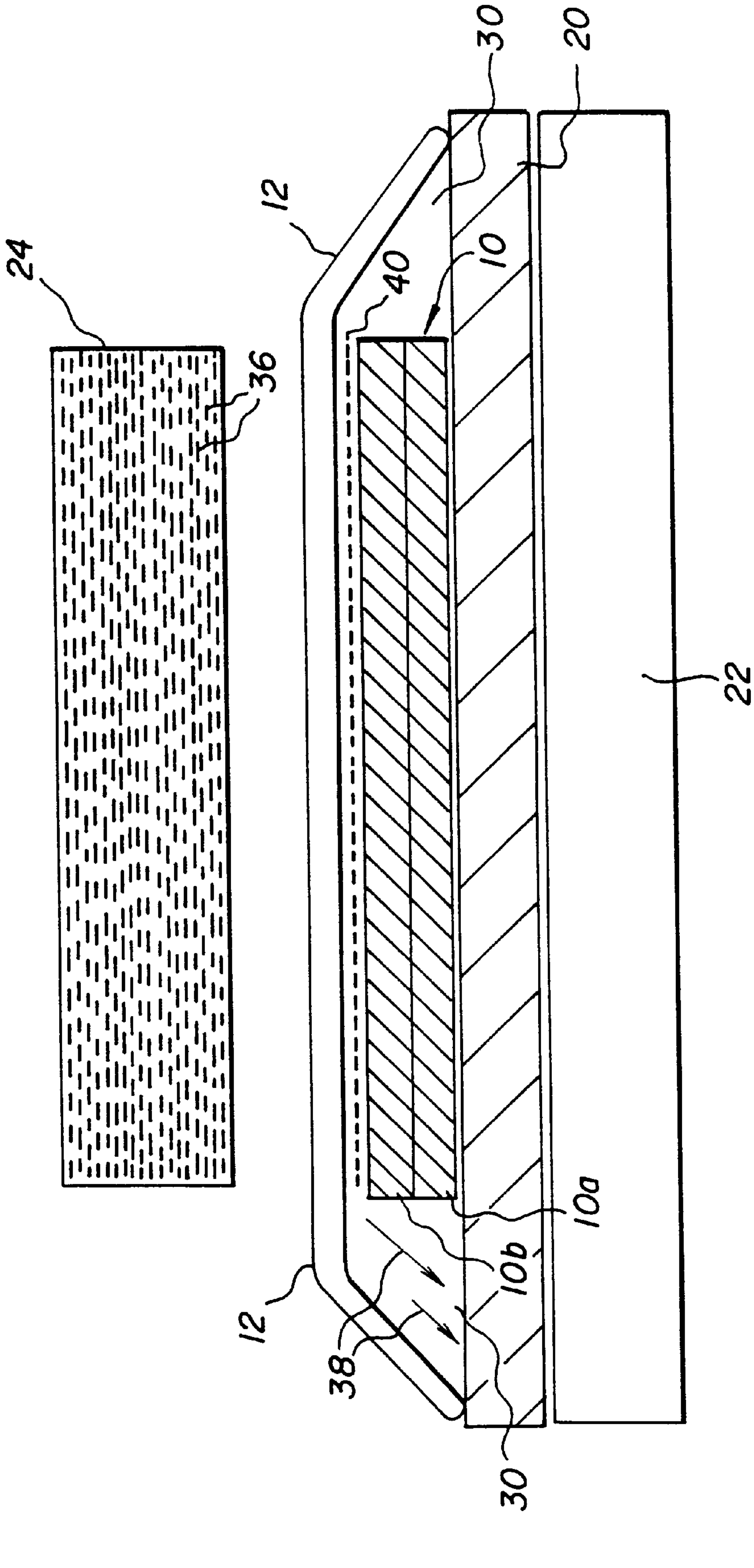
FIG. 4 shows details of the transfer printing on a greatly enlarged scale.

That is explained in more detail in FIG. 4 which shows the individual parts in a much distorted enlargement to illustrate the process of the sublimation and penetration of the dye molecules into the substrate. As already noted, the air flow 34 from outside through the dye carrier 12 and the air flow 38 below the dye carrier 12 produce a uniform, close fitting engagement, free of tension and blisters, of the dye carrier 12 to the substrate 10. The substrate 10 is heated by the table plate 20 to a temperature higher than the temperature at the surface of the substrate 10 to be imprinted in order to achieve a print on the substrate 10 which is particularly resistant to migration. In FIG. 4 thus a rising temperature gradient is formed from top to bottom. As a consequence of this temperature gradient the dyestuff molecules 40 enter quite far into the substrate following sublimation. That portion of substrate 10 into which the molecules 40 enter is designated **10*b* in FIG. 4, while the portion which remains substantially free of dyestuff molecules is marked 10*a***.

The degree of heat-up at the surface of the substrate 10 and accordingly at the bottom side of the dye carrier 10 (measured by the temperature measuring means 26 according to FIG. 2) depends on the material of the substrate 10. The heat-up is between 60° C. (e.g. for ABS) and 150° C. (e.g. for PBT). Heating up to 130° C. has proved to be favorable for PC. The temperature at the bottom side of the substrate 10 (measured by the temperature sensor 27 according to FIG. 3) is to be approximately from 3 to 30° C. higher in each instance, especially from 5 to 15 C. higher, depending on the kind and thickness of the material.

Specifically, temperature values from 120 to 135° C. in the sublimation range (i.e. at the underside of the carrier and top side of the substrate) have proved to be favorable for PC, for ABS they are fom 90 to 100° C., for PBT from 150 to 160° C., and for PET from 80 to 90° C.

The problem of re-sublimation is solved by the relatively low temperatures applied according to the invention.

The sublimation procedure is terminated in 10 to 30 seconds, depending on the thickness of the substrate 10 and its material.

The quality of the resulting product can be improved still further by controlling the intensity of the individual infrared radiators 36 in response to the color to be sublimed by the respective radiator. Different colors require different energies per unit area for the sublimation. Thus the energy demand rises by some 20% (and accordingly also the temperature to be produced by the infrared radiation) from yellow via red and cyanic to black. That is taken into account by individual control of the various infrared radiators in correspondence with the prevalent color proportion directly underneath the radiator. Hereby uniform sublimation is achieved for all colors and, at the same time, the surface of the substrate on which to be printed is heated sufficiently uniformly, which enhances the picture quality. FIG. 5 shows in exemplary form, at the left, an image for printing on the dye carrier 12, the outermost zones 12*a*, 12*b*, and 12*c* having lighter colors (intensifying from yellow to red), while the image keeps getting darker toward the middle until it has a black zone in the central area. At the right, FIG. 5 correspondingly shows a diagramatic presentation of the infrared radiators 36 in the housing 24, seen from below (for example with reference to FIG. 4), with 100% of a given IR output being produced by the infrared radiators in the central zone in correspondence with the black portion of the image, while the infrared power is reduced toward the outside, as indicated in each case.

It is preferred to blacken the dye carrier 12 at its backside.

The penetration depth achieved by the method described above of the sublimable dyestuff molecules into the substrate, of from 100 to 300 microns, or from 200 to 350 microns, does not cause fading of the image. Instead, surprisingly it provides quality improvement of the image; the image appears more intensively and three-dimensionally. The migration resistance is negligible. The product made as specified may be subjected to short-term impact heating of e.g. from 200 to 300° C. for two to three minutes for purposes of thermal deformation without suffering loss in image quality. Even permanent heating from 100 to 200° C. is possible (depending on the kind of plastics, e.g. 145° C. for PC and 200° C. for PBT). The substrate surface is not damaged. The plastics surface retains its structure without any alteration, irrespective of whether the surface is of high glaze, mat, silky-mat, curved, coarse or fine structured character. By virtue of the electrostatic forces of attraction and the simultaneously active vacuum forces the quality of the picture is good even if the surfaces are coarse, rough, or fine structured.

Relatively large quantities of dyestuffs (from 10 to 20 g wet, or from 3 to 7 g dry) can be transferred by the method specified. Hereby and by the great diffusion depth described, thermodeformation up to 250% expansion can be carried out without fading or brightening of the colors.

We claim:

1. A method of creating a decorative design by applying multicolored dyestuffs on, and incorporating them in, a substrate comprising plastic materials, comprising the steps of placing a single carrier with multicolored dyestuffs on a substrate, said carrier having one side in contact with the substrate and an opposite exposed side, and transferring the multicolored dyestuffs on said carrier to the substrate by heating the carrier with infrared radiation, wherein the carrier is heated at its exposed side to temperatures of below 170° C. depending on the plastic material of the substrate, the carrier is placed in contact with the substrate by air suction, in such a manner that a subpressure results between the carrier and the substrate, the intensity of the infrared radiation applied to the carrier is controlled in correspondence with the prevalent color portions of the multicolored dyestuffs to which the infrared radiation is applied, the intensity of the infrared radiation applied to the carrier being different for each color of said multicolored dyestuffs carried thereby, said infrared radiation thereby being directed inhomogeneously to the carrier depending on the color distribution of the decorative design.

2. The method as defined in claim 1 wherein the substrate is heated in a manner such that the side of the substrate in contact with the carrier is heated less than the opposite exposed side of the substrate.

3. The method as defined in claim 1 wherein the substrate is placed directly on a heatable table formed with a plurality of channels through which air is sucked, the carrier is placed on the substrate in such a manner that it clearly overlaps the substrate along the edges thereof, and the carrier is pressed against the substrate directly by air suction through said channels.

4. The method as defined in claim 1 wherein the carrier is heated to temperatures of from 110° C. to 140° C. at its exposed side.

5. The method as defined in claim 1 wherein during transfer, the multicolored dystuffs penetrate from 200 to 350 microns into the substrate.

6. The method as defined in claim 1 wherein the carrier is blackened at its exposed side.

7. The method as defined in claim 1 wherein the full surface area contact of the carrier with the substrate is enhanced by electrostatic charging.

* * * * *